United States Patent Office 3,829,435
Patented Aug. 13, 1974

---

3,829,435
2,5-DICHLOROTHIAZOLO [5,4-d] THIAZOLE AND PROCESS FOR PREPARING SAME
Gunther Beck and Hans Holtschmidt, Leverkusen, Germany, assignors to Bayer Aktiengesellschaft, Leverkusen, Germany
No Drawing. Filed Mar. 7, 1973, Ser. No. 338,708
Claims priority, application Germany, Mar. 25, 1972, P 22 14 610.7
Int. Cl. C07d 91/42
U.S. Cl. 260—306.8 F                    3 Claims

ABSTRACT OF THE DISCLOSURE 2,5-dichlorothiazolo[5,4-d] thiazole having insecticidal properties of the formula:

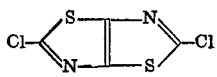

is prepared by reacting tetrachloroethylene-bis-(isocyanide dichloride) having the formula:

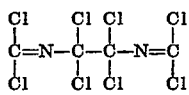

with at least the stoichiometrically necessary quantity of sulphur at a temperature in the range of from 150° to 350° C.

---

This invention relates to the new compound 2,5-dichlorothiazolo [5,4-d] thiazole, and to a process for its production.

SUMMARY

It has been found that 2,5-dichlorothiazolo [5,4-d] thiazole, corresponding to the formula (I):

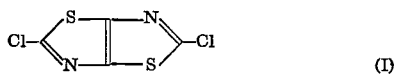

can be obtained by reacting tetrachloroethylene-bis-(isocyanide dichloride) corresponding to the formula (II):

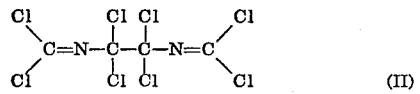

with at least the stoichiometrically necessary quantity of sulphur at a temperature in the range of from 150 to 350° C.

DESCRIPTION

The reaction is preferably carried out at a temperature in the range of from 180 to 280° C.

The process is illustrated with reference to the following example:

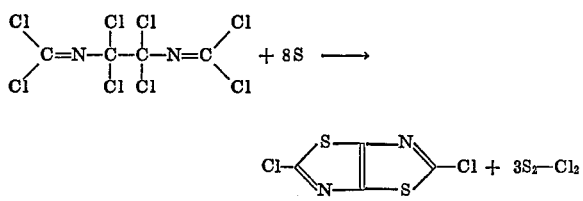

In general, at least 8 mols of sulphur are used per mol of the compound corresponding to formula (II). It is advantageous to use an excess of from twice to three times the stoichiometrically necessary quantity of sulphur. In this case, the excess sulphur may optionally be returned to the reaction circuit. Working with less than 8 mols of sulphur per mol of compound (II) would result in the undesirable formation of a compound with the summation formula $C_4Cl_4N_2S$.

The starting compound is known (U.S. Pat. No. 3,251,760).

To carry out the process according to the invention, the starting compound is mixed with at least the stoichiometrically necessary quantity of sulphur and the resulting mixture is heated, preferably to a temperature of from 180 to 280° C., until the reaction begins. In one preferred embodiment of the invention, the sulphur is initially introduced into the reaction vessel and the starting compound (II) is added to it in portions at the particular reaction temperature, for example over a period of from 30 minutes to 10 hours, depending on the size of the batch. The reaction can be carried out in an open or in a closed vessel. When the reaction is carried out in a closed vessel, for example an autoclave or a bomb tube, the starting components are heated to a temperature in the aforementioned range and, after cooling, the disulphur dichloride formed is separated off (together with a smaller quantity of sulphur dichloride), for example by fractional distillation. However, the crude mixture can also be treated, for example with water, and the sulphur formed is then filtered off together with the reaction product corresponding to formula (I). The residue is dried and the sulphur is separated off from the reaction product (I), for example by dissolving in carbon disulphide.

When the reaction is carried out in an open vessel, it is best to continuously distil off the sulphur chlorides formed in order to be able to keep the reaction temperature at the required level and, hence, to obtain as complete a conversion as possible. The reaction is complete when no more significant quantities of sulphur chlorides distil over. The reaction time generally amounts to between 30 minutes and 10 hours, depending upon the size of the batch.

The process is generally carried out in the absence of solvents, although it can also be carried out in the presence of an organic solvent which boils at a temperature in the range used and which is inert towards the reactants, for example, 1,2,4-trichlorobenzene, naphthalene, a methylnaphthalene, acenaphthylene or similar compounds. The process can, of course, also be carried out continuously.

The new dichlorothiazolothiazole corresponding to formula (I) obtained by the process according to the invention can be used for the production of plant protection agents, although it does itself have insecticidal properties. These are illustrated in the following test.

Drosophila test:
Solvent: 3 parts by weight of dimethyl formamide
Emulsifier: 1 part by weight of alkylaryl polyglycol ether.

To prepare a suitable active substance preparation, 1 part by weight of the active substance is mixed with the specified quantity of solvent containing the specified quantity of emulsifier and the concentrate is diluted with water to the required concentration.

1 cc. of the active substance preparation is pipetted onto a circular filter paper 7 cm. in diameter. The filter paper is placed wet on a glass dish containing 50 dew flies (*Drosophila melanogaster*) and covered with a glass plate.

The mortality rate in percent is measured after the interval specified. 100% means that all the flies were killed, 0% means that no flies were killed.

The active substance, active substance concentration, evaluation period and mortality rate are set out in Table (I):

TABLE (I)

| Active substance | Active substance concentration in percent | Mortality rate in percent after 1 day |
|---|---|---|
| 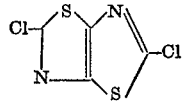 | 0.1 | 60 |
| The new compound is also active against: *Rhopalosiphum padi* (System-effect) | 0.1 | 80 [1] |
| *Plutella* | 0.1 | 60 [2] |

[1] After 4 days.
[2] After 3 days.

EXAMPLE 1

512 g. (16 mols) of sulphur are placed in a three-necked flask equipped with a stirrer, thermometer and distillation bridge, which is then placed in a metal bath at a temperature of from 245 to 250° C. 360 g. (1 mol) of tetrachloroethylene - bis - (isocyanide dichloride) are then added in portions in the absence of air over a period of 3 hours. The portions added should be measured in such a way that the internal temperature does not fall below 235° C. On completion of the addition, the mixture is kept at the bath temperature of from 245 to 250° C. for 30 minutes. After cooling, the residual sulphur chlorides are initially distilled off on a boiling water bath under a water-jet vacuum. This is followed by fractionation in an oil pump vacuum (0.5 Torr) at a temperature gradually increasing up to a metal bath temperature of 250° C. and then quickly (over 15 minutes) up to 300° C. Most of the excess sulphur is left in the residue. The distillate solidifying in the receiver is recrystallised from washing spirit. A little sulphur which crystallises out with the distillate is dissolved in carbon tetrachloride. 2,5-dichloro-thiazolo [5,4-d] thiazole corresponding to the formula (I) is obtained in a yield of 62 g. (29.4% of the theoretical), m.p. 171 to 172° C. The compound shows a highly characteristic infrared spectrum with sharp bands at 1410, 1287, 1071, 889, 495 and 398 cm.$^{-1}$.

The sulphur chlorides which distill off quickly over the bridge during the reaction take appreciable quantities of the thiazolothiazole with them. Redistillation of the sulphur chlorides in a column leaves behind a residue which, after suitable working up, yields another 16 g. of pure 2,5-dichlorothiazolo [5,4-d] thiazole, bringing the total yield to 37% of the theoretical.

EXAMPLE 2

The procedure is as in Example 1, except that the metal bath temperature is kept at 280° C. The total yield after working up as in Example 1 is 48 g. (22.8% of the theoretical) of 2,5-dichlorothiazolo [5,4-d] thiazole.

EXAMPLE 3

The procedure is as in Example 1, except that only 256 g. (8 mols) of sulphur are used. The total yield is 56 g. (26.5% of the theoretical) of 2,5-dichlorothiazolo [5,4-d] thiazole.

EXAMPLE 4

360 g. (1 mol) of tetrachloroethylene-bis-(isocyanide dichloride) and 256 g. (8 mols) of sulphur are mixed and reacted for 3 hours over a metal bath at a temperature of 240° C. in an apparatus of the kind described in Example 1. Working up as described in Example 1 gives 42.5 g. (20.1% of the theoretical) of 2,5-dichlorothiazolo [5,4-d] thiazole.

What we claim is:

1. 2,5-dichlorothiazolo [5,4-d] thiazole having the formula:

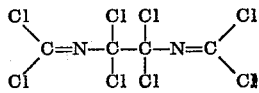

2. Process for preparing 2,5-dichlorothiazolo [5,4-d]-thiazole which comprises reacting tetrachloroethylene-bis-(isocyanide dichloride) having the formula:

$$\begin{array}{c} Cl \\ \diagdown \\ Cl \end{array} C=N-\underset{\underset{Cl}{|}}{\overset{\overset{Cl}{|}}{C}}-\underset{\underset{Cl}{|}}{\overset{\overset{Cl}{|}}{C}}-N=C \begin{array}{c} Cl \\ \diagup \\ Cl \end{array}$$

with at least the stoichiometrically necessary quantity of sulphur at a temperature in the range of from 150° to 350° C.

3. Process of claim 2 wherein the reaction is carried out at from 180° to 280° C.

References Cited

UNITED STATES PATENTS 3,282,951  11/1966  Spivack et al. ___ 260—306.8 F

FOREIGN PATENTS 2,009,253  1/1970  France _____ 260—306.8 F

RICHARD J. GALLAGHER, Primary Examiner

U.S. Cl. X.R.

424—270

UNITED STATES PATENT OFFICE
CERTIFICATE OF CORRECTION

Patent No. 3,829,435　　　　　　　　Dated August 13, 1974

Inventor(s) Gunther Beck and Hans Holtschmidt

It is certified that error appears in the above-identified patent and that said Letters Patent are hereby corrected as shown below:

Column 4, line 25 (Claim 1 formula)

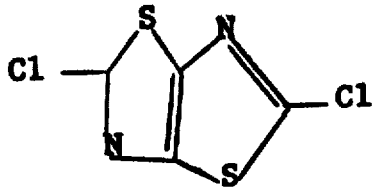　　should be　　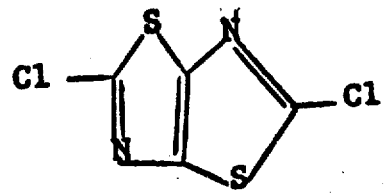

Signed and sealed this 19th day of November 1974.

(SEAL)
Attest:

McCOY M. GIBSON JR.　　　　　　　C. MARSHALL DANN
Attesting Officer　　　　　　　　Commissioner of Patents